United States Patent [19]

Will

[11] 3,734,867

[45] May 22, 1973

[54] METHOD OF PRODUCING POROUS POLYMERIZATES FROM WATER-IN-OIL EMULSIONS

[76] Inventor: Gunther B. G. P. Will, Zimmerstrasse 10-12, 61 Darmstadt, Germany

[22] Filed: Dec. 17, 1971

[21] Appl. No.: 209,408

Related U.S. Application Data

[63] Continuation of Ser. No. 879,943, Nov. 25, 1969, abandoned.

[52] U.S. Cl. ........260/2.5 R, 260/2.5 L, 260/2.5 M, 260/17.4 SG, 260/23 EM, 260/23 P, 260/29.2 UA, 260/29.6 MQ, 260/29.6 WQ, 260/29.6 MN, 260/75 UA, 260/861, 260/862
[51] Int. Cl. ........................C08f 47/08, C08f 1/13
[58] Field of Search ..............260/2.5 M, 2.5 L.2.5 R, 260/29.6 WQ, 75 UA

[56] References Cited

UNITED STATES PATENTS 3,256,219  6/1966  Will........................................260/2.5

*Primary Examiner*—John C. Bleutge
*Assistant Examiner*—Wilbert J. Briggs, Sr.
*Attorney*—William D. Hall, Elliott I. Pollock, Fred C. Philpitt et al.

[57] ABSTRACT

Polymerization of water-in-oil emulsions which contain a polymerizable monomer, a water-in-oil emulsifier, and an oil-in-water emulsifier (in an amount less than that required to break the emulsion) is disclosed. Various products and fields of application are also disclosed, including especially the manufacture of shaped products.

15 Claims, No Drawings

METHOD OF PRODUCING POROUS POLYMERIZATES FROM WATER-IN-OIL EMULSIONS

This application is a continuation of application Ser. No. 879,943, filed Nov. 25, 1969, and now abandoned.

INTRODUCTION

It is known that porous shaped articles can be obtained through polymerization of a polymerizable liquid, when water or mixtures of water and solvents are dispersed in the monomeric phase and this system is subjected to polymerization, using polymerization catalysts and/or activators. The water thereby enclosed inside the polymerizate can be expelled during and/or after polymerization. Such methods have been described, for example, in the German Preliminary Publication (DAS) No. 1,150,524 and in the Belgian Patent No. 622,034.

The emulsion of the water-in-oil type is produced in the presence of emulsifiers containing hydrophobic and hydrophilic groups and which dissolve exclusively, or at least preferentially, in the polymerizable liquid. The emulsions created in this manner are stable, but they are easily upset, meaning that phase separation occurs, when compounds which are hydrophilic or in which hydrophilic groups predominate, are introduced. The emulsifiers used for the production of the emulsion will in the following be referred to simply as W-O-emulsifiers, as distinct from the O-W-emulsifiers which are used in the production of stable oil-in-water emulsions. Both kinds of emulsifiers are specific for the emulsions for which they are used, and therefore, if they are used for the other type of emulsion, they cause phase separation.

At an early stage in the development of this art, it was recognized that retention of the water in the polymerizing mixture in a dispersed condition was a problem. Thus, it was proposed first by Hazell and later by Fisk in U.S. Pat. Nos. 2,112,529 and 2,505,323 respectively, that the water be held in place by adsorption upon an inorganic solid adsorbent such as silica gel which was distributed throughout the mixture to convert it to a paste. Although Fisk experimented with mixtures which contained no silica gel, the results were unsuccessful, and it appeared quite clear that the solid adsorbent was essential.

Prior to issuance of Fisk's patent, it was already known that water-in-oil emulsions could be prepared with the aid of polymeric emulsifiers, such as polyester resins, However, it seemed inevitable through the teachings of Kropa, U.S. Pat. No. 2,443,735, that water-in-oil emulsions based upon polymeric emulsifiers would break when subjected to polymerizing conditions. This may explain — in retrospect — why the technique of forming porous plastic products from water-in-oil emulsions was not obvious to those skilled in the art. Indeed, the teachings of Kropa clearly led away from such technique.

In an article on a distinctly different type of polymerization process (Ueber den Mechanismus der dreiphasigen Emulgierung bei der Perpolymerization, Makromolekular Chemie, Vol. 20, pp. 196–213, 1956) Wenning incidentally disclosed polymerization of a water-in-oil emulsion supported by inorganic, water- and oil-in-soluble barium sulfate particles coated with double layers of non-polymeric emulsifier. The insoluble solid particles of barium sulfate attracted the hydrophilic groups in the first layer of emulsifier molecules, and this in turn caused the hydrophilic groups in the second layer to turn outwards. Because Wenning's emulsification system was so unlike that of Kropa, Wenning in no way reduced the force of Kropa's teachings that water-in-oil emulsions based on polymeric emulsifiers would break on polymerization. Indeed, Wenning tended to reinforce Fisk's teaching of the necessity of using an inorganic solid adsorbent (for the water or the emulsifier) in order to produce porous products.

Even when Belgian Patent 558,970 issued in 1958 and corresponding U.S. Pat. No. 3,027,336 issued to Franz Goetz, Helmut Will and the present inventor, they did not disclose the idea of sustaining a water-in-oil emulsion containing minute water droplets until polymerization had solidified the surrounding monomeric phase. The teachings of those patents suggested preparing a paste in which the weight percentage of solids substantially exceeded that of the liquids and than polymerizing under conditions which drove the bulk of the water out of the pasty mixture so that even if a water-in-oil emulsion could have formed, it would have broken prior to solidification.

Thereafter, the present inventor discovered and described in U.S. Pat. No. 3,256,219 a method of producing porous products having very small pore sizes, e.g., $50\mu$ or less, by maintaining a water-in-oil emulsion during polymerization until the resultant solidification of the oil phase had essentially immobilized the water. Thus, the voids in the resultant resinous matrix essentially corresponded to the extremely small dimensions which characterized the water droplets in the emulsion. Moreover, it was shown that contrary to the teachings of the prior art, this could be done with polymeric emulsifiers.

The aforementioned patent describes the production of porous products in which the extent of intercommunication between cells varies. As between such products, the ease of removing the water after the polymerization varies. Further experimentation and commercial experience with these products has shown that those with increased quantities of open cells have definite advantages for certain applications but are the most difficult to produce in a reproducible manner. Thus, for instance, it was discovered that open-celled products were useful in making quick-drying molded products.

Heretofore, when making products characterized by a high percentage of open cells, it was found that a certain phase transition occurred during polymerization. As was pointed out in U.S. Pat. No. 3,256,219, this phase transition could be promoted by the addition of acidic substances, but the phenomenon proved difficult to control. On the one hand, the phase transition broke the emulsion to form a pulverulent to finely grained polymer similar to that described by Kropa in U.S. Pat. No. 2,443,801. On the other hand, the phase transition produced solid, sponge-like resinous products having mostly relatively large cavities readily observable with the naked eye. These sponge-like products such as are described by Wenning, are not to be confused with the products of the present invention.

BRIEF SUMMARY OF THE PRESENT INVENTION

Surprisingly, however, it has now been discovered that porous polymerizates can be produced very successfully in a water-in-oil emulsion, when to the stable emulsion which contains a W-O-emulsifier is added a specific quantity of O-W-emulsifier, but this quantity must in no case be of such magnitude that the stability of the W-O-emulsion is endangered.

These O-W-emulsifiers which, when employed alone, are unsuitable for forming W-O-emulsions and which, according to prior teachings, would separate their phases, may be added either to the completed emulsion or to the polymerizable liquid. It is particularly advantageous to add the O-W-emulsifiers to the completed emulsion. This method offers the most reliable way of determining the maximum permissible amount of the O-W-emulsifier. The emulsifier is slowly added under continuous agitation and its addition is interrupted as soon as the first signs of phase separation become noticeable. In this boundary situation, the stability of the W-O-emulsion is then re-established and maintained by additional agitation. By this procedure represents the best way of taking into account the peculiarities of the various types of emulsifiers and of the monomeric liquid, as well as of their mutual interaction.

Examples of Materials Useful in Practicing the Invention

COMPONENT W

The term "water" as employed herein includes water per se, and liquid aqueous media which contain at least 25 percent of water and any other desired ingredients which are non-deleterious in respect to the creation and maintenance of the water-in-oil emulsion and the polymerization of the monomer component M. Non-limiting classes of such other ingredients include salts, solvents and colorants and mixtures thereof. Examples include: alcohols, in particular lower monohydric aliphatic alcohols with one to about six carbon atoms such as methanol, ethanol, isopropanol and n-, iso- and tertiary-butanol; lower organic acids containing one to about six carbon atoms, such as acetic and propionic acids; lower ethers and ketones with one to about six carbon atoms, including methyl ethyl ether and dimethyl ketone; water soluble inorganic salts such as sodium chloride, potassium sulfate, sodium sulfate, magnesium sulfate and magnesium chloride; organic liquids with high dielectric constant like formamide, dimethylformamide, saccharose, glucose, fructose, or other carbohydrates in aqueous solution. At present, the best results have been obtained with water per se.

COMPONENT M

All known polymerizable water-immiscible ethylenically unsaturated monomers which are polymerizable to water-insoluble polymers in the form of water-in-oil emulsions are useable in the present invention. Those which have a single terminal

group and have a solubility in water not exceeding about 10 percent by weight are preferred. For example, the following types of compounds may be employed:

1. aromatic monovinyl hydrocarbons (such as styrene) as well as styrenes alkylated in the side chain or the nucleus (such as α-methyl styrene) and halogenated styrenes (such as chlorostyrenes);

2. aliphatic vinyl and vinylidene halides, such as vinylidene chloride and solutions of vinyl chloride in liquid monomers;

3. monovinyl esters of vinyl alcohol and aliphatic saturated monocarboxylic acids containing from two to four carbon atoms in the molecule, for example vinyl acetate, vinyl propionate, vinyl butyrate and vinyl chloroacetate;

4. derivatives of α, β -olefinically unsaturated monocarboxylic acids, especially of acrylic and substituted acrylic acids, for example nitriles (such as acrylonitrile or methacrylonitrile) and esters with an aliphatic saturated monohydric alcohol containing from one to 12 carbon atoms in the molecule, for example the methyl ester, ethyl ester, propyl ester, butyl ester, octyl ester and dodecyl ester of acrylic acid and methacrylic acid;

5. monoesters and diesters of α, β-olefinically unsaturated dicarboxylic acids (such as maleic and fumaric acid) with a monohydric aliphatic saturated alcohol containing from one to 12 carbon atoms in the molecule, for example, monoethyl maleate, monobutyl maleate, monocyclohexyl maleate, monododecyl maleate and dimethyl fumarate;

6. aliphatic conjugated diolefines containing from four to six carbon atoms in the molecule such as isoprene or 2-chlorobuta-1,3,-diene and solutions of butadiene in liquid monomers;

7. unsaturated polyesters in admixture with copolymerizable monovinyl compounds as exemplified in detail below.

It is of course also possible, if the production of crosslinked polymers is desired to polymerize the aforementioned monomers in the presence of from 0.05 to 95 percent preferably 0.25 to 50 percent by weight, of other monomers containing a plurality of (preferably 2 and 3) olefinically unsaturated carbon-to-carbon double bonds. The following are mentioned as examples of such compounds: diesters of acrylic or methacrylic acid with polyhydric alcohols (such as glycol dimethylacrylate); polyallyl esters of polybasic, preferably dibasic, carboxylic acids (such as diallyl phthalate); heterocyclic compounds containing three polymerizable carbon-to-carbon double bonds (such as triallyl cyanurate and triallyl-s-perhydrotriazine); and aromatic polyvinyl compounds (such as divinyl benzene or trivinyl benzene).

Other monomers which can be used are those which contain at least one vinylidene grouping or at least one polymerizable carbon-to-carbon double bond. Examples of these are halogenated hydrocarbons such as polyhalogenocyclopentadienes, mixed polyhalogenated hydrocarbons, e.g., of the trichlorofluoroethylene type and polymerizable compounds which contain phosphorus atoms such as triallyl phosphate.

The preferred monomers are: the esters of the acrylic and methacrylic series (preferably methyl methacrylate); styrene; and other monomers which are copolymerizable with the foregoing, including acrylonitrile or ethylene glycol dimethacrylate or condensates or precondensates of polyesters or phenolic, urea or melamine resins.

Oil phases comprising mixtures of polyesters and copolymerizable vinyl monomers are of considerable importance. Copolymerizable vinyl monomers are those having at least one polymerizable $CH_2=CH-$ group, preferably styrene. As unsaturated polyesters containing polymerizable double bonds, there are more especially considered those of α, β-unsaturated dicarboxylic acids such as maleic and/or fumaric and/or phthalic and other acids which have been condensed with saturated di- or poly-hydric alcohols, such as ethylene glycol, diethylene glycol, triethylene glycol, propane-1, 2- and -1,3-diol, 2,2-dimethyl propanediol, 1,1,1-trimethylol propane and glycerine. The polyesters may or may not contain significant quantities of polyether linkages, such as are obtained when preparing them from acid anhydrides and alkylene oxides in the presence of certain catalysts; see for instance U.S. Pat. No. 3,382,217 to Leslie Case. The ratio between the polyester co-polymer components is within the usual limits in preparing co-polymers of the alkyd resin type, i.e., generally a ratio between unsaturated polyester and vinyl monomer of between 9:1 to 1:9 (by weight) is employed.

The conversion of the polyester to the salt form is of significant value in increasing the quantity of water that may be incorporated in the emulsion. In this connection, see U.S. Pat. No. 3,256,219, and the article by Horie et al., *Journal of Applied Polymer Science*, Volume 11, pp. 57–71(1967), the disclosures of which are incorporated herein by reference.

The polymerizable unsaturated compounds should be contained in the oil phase, or are the oil phase, in quantities of 5 to 100 percent by weight, preferably 50 to 100 percent by weight. The remainder of the oil phase (if any) may include non-polymerizable compounds of low and high molecular weight including plasticizers, flame-proofing agents and other adjuvants, but care should be taken to control the addition of strongly hydrophilic compounds so that the desired water-in-oil emulsion is not interferred with. Nonlimiting examples of such compounds include benzene, dibutyl phthalate, dimethyl adipate, tricresyl phosphate and organo metallic compounds which do not disturb the polymerization process.

COMPONENT W-O

The W-O-emulsifiers utilized are compounds known for the water-in-oil type of emulsion. The decision which emulsifier to use in a specific case not only depends upon the type of the liquid to be polymerized, but it is also determined by the maximum amount of the OW-emulsifier used. By simple preliminary experiments, the best combinations can be determined quickly and reliably.

A wide variety of such emulsifying agents is known to those skilled in the art. For instance, hexadecyl sodium phthalate, sorbitan monooleate, sorbitan monostearate, cetyl or stearyl sodium phthalate and the like are a few. Also to be considered are high molecular weight alcohols, alkaline earth metal and aluminum soaps, fatty acid anilides, sterines, steroids, and polymers of vinyl monomers such as styrene and the esters of acrylic acid which contain terminal hydrophilic groups. Emulsifying agents having a low hydrophile-lyophile balance are preferred. Exemplary emulsifiers are taught in the literature, e.g., by the Atlas HLB Surfactant Selector. Quantities ranging between about 0.01 and 10 percent by weight based on the oil phase are useful, although larger or smaller amounts may be used.

The preferred water-in-oil emulsifiers are polymeric materials and a wide variety of them has already been described in the prior art. See, for instance, U.S. Pat. Nos. 3,256,219; 3,244,772; 3,442,842 and 3,255,127; British Patents 928,621; 962,702 and 967,223; the above-mentioned Horie et al. article; German Patentschrift No. 965,722; and Dutch Printed application No. 124,154. The disclosures of the foregoing patents and published application relative to water-in-oil emulsifiers are hereby incorporated herein by reference.

Among the most commonly used polymeric emulsifiers are those which contain, per 100 weight parts of polymer, 1.0 to 4.0 parts by weight of —OH groups, or 0.3 to 7.5 parts by weight of —$SO_3H$ groups, or 0.6 to 2.0 parts by weight of —$SO_3Na$ groups, or 1.0 to 6.0 parts by weight of =$SO_4$ groups, or 0.5 to 10.0 parts by weight of —$CONH_2$ groups, or combinations thereof.

While the water-in-oil emulsifier W-O is ordinarily a separate element of the compositions of the invention, it may be one and the same with one of the other of the components of the compositions which is able to perform the same function. For instance, the polyester resin which may be present in the oil phase may support a water-in-oil emulsion. Thus, the component W-O recited in the appended claims may be satisfied either by one of the other components of the composition or by a separate and distinct water-in-oil emulsifier.

The water-in-oil emulsifier must be present in sufficient amount to form a water-in-oil emulsion of sufficient stability to withstand without breaking the normal stimulae of shear, mechanical shock, temperature changes and the like which normally occur in production facilities during the preparation, pumping, agitation and shaping of the emulsions. In general, amounts between about 0.01 and about 3 percent and more preferably 0.05 to 1 or 2 percent by weight based on the component M are used. However, in the case of emulsifiers having a very low efficiency, substantially greater amounts to as high as 10 percent or more by weight may be required.

The suitability and efficiency of emulsifiers may be determined by simple bench tests. For instance, a valuable test for screening polymeric emulsifiers is to dissolve the water-in-oil emulsifier in an equal weight of the oil phase or monomer and observe whether the dropwise addition of water partially separates the emulsifier from the oil phase, to produce a visually observable turbidity, at least at the phase boundary. In general, the more turbidity, the more efficient the emulsifier. The same test is also useful in screening low molecular weight emulsifiers.

COMPONENT O-W

The oil-in-water emulsifier O-W may be any water-soluble wetting agent(s) known in the art. They may possess some degree of solubility in the oil phase but are normally preferentially soluble in the water phase. Substantially all preferentially water soluble wetting agents are suitable, including anionic, cationic, and non-ionic, so long as the wetting agent has the property of tending to appreciably destabilize water-in-oil emulsions. Wetting agents are distinct from water-in-oil emulsifiers in that the former are, of themselves, unable to sustain water-in-oil emulsions when used in conventional emulsifying quantities, and actually tend to reverse water-in-oil dispersions. For this reason, it has previously been indicated by Fisk in U.S. Pat. No. 2,505,353, that such materials should be excluded when attempting to prepare microporous products by polymerizable systems containing dispersed water. See Fisk, Column 6, Lines 20–22. Also, as disclosed by Kropa, previous experience with such materials associated their presence with formation of latices, indicating oil-in-water emulsions. Indeed, most, if not all, of the wetting agents which are useful in the practice of the present invention, normally function as water-in-oil emulsifiers.

In accordance with the present invention, the quantity of wetting agent(s) employed is limited to less than that required to break the water-in-oil emulsion. The amount of wetting agent which will break the emulsion may be determined by a simple test. To a sample of a finished water-in-oil emulsion (lacking only the wetting agent) a highly dilute aqueous test solution of the wetting agent (about one part per thousand parts of water by weight) is added slowly with stirring until the emulsion is visually observed to break. By simple calculations based upon the concentration and volume of test solution used and the quantity of emulsion tested, it is possible to determine what proportion of wetting agent was present in the composition just prior to breaking. However, as indicated below, less than the maximum amount will normally suffice, and the amount of care required in transporting the emulsion to the shaping member or mold and filling the mold may be reduced somewhat when such lesser amounts are used.

Although the wetting agent is normally added as a distinct element of the compositions, one or more of the other components may contain the required amount of wetting agent in the form in which they are supplied. For instance, pulverulent powder additives, as supplied, may contain residual (even substantial) amounts of wetting agents, and the presence of such residual wetting agents may suffice for purposes of the invention. However, in most cases, a predetermined amount of wetting agent will be introduced into the compositions as a distinct added element. In any event, the component O-W recited in the appended claims may be satisfied either by one of the other components of the composition or by a separate and distinct wetting agent, but the component O-W will be distinct from the component W-O.

A wide variety of wetting agents is commercially available, including such compounds as aryl alkyl sulfonates, alkyl sulfonates, alkyl sulfates, fatty alcohol sulfonates, fatty acid condensation products (including esters), and ethylene oxide adducts. Specific examples of anionic wetting agents include esters of sodium sulfosuccinic acid such as dioctyl sodium sulfosuccinate and sodium oleate. Specific examples of cationic wetting agents include quaternary ammonium salts such as lauryl ammonium acetate and octadecyl ammonium chloride. Specific examples of non-ionic wetting agents include isooctyl phenyl polyethoxy methanol and glyceryl monolaurate.

Before, during or subsequent to the brining together of the components W, P, M, W/M and W/A, a suitable activator system is added to one or more of them. The activator system is not part of the invention disclosed herein, and those skilled in the art are acquainted with and have the requisite skill to select many which are suitable. Thus, by way of example only, it is contemplated that both monomer-soluble and water-soluble free-radical forming compounds or Redox systems suitable for polymerization purposes may be included, although monomer-soluble activators are preferred. Activator compounds, which have already been disclosed as having usefulness in polymerizing W/O emulsions include: free-radical forming nitrogen compounds, such as azodiisobutyric acid dinitrile; peroxides, especially acyl peroxides (such as lauroyl peroxide and benzoyl peroxide); alkyl- as well as dialkyl- peroxides (such as tertiary butyl hydroperoxide, cumene hydroperoxide, p-methane hydroperoxide, and di-tertiary butyl hydroperoxide), ketone peroxides (such a methyl ethyl ketone peroxide and cyclohexanone peroxide); percarbonates; mixtures of peroxides with amines (such as dimethyl-p-toluidine, diethanolamine or triethylene tetramine); metal compounds such as cobalt naphthenate. It has been suggested that peroxides whose half-life period below 100° C. is less than 10 hours are of preferred interest as activators. With activators including aliphatic (e.g., lauroyl) or aromatic (e.g., benzoyl) organic acid peroxides, and tertiary amine such as dimethyl-p-toluidine or dimethylaniline, the compositions may be cured in 5 to 50 or more preferably 8 to 10 minutes at a temperature below 18° C. With appropriate activators, higher temperatures may be used. However, suitable precautions should then be taken to substantially prevent premature evaporation or loss of water, e.g., as by putting compositions under pressure, until the mass has cured or solidified to the extent necessary. With some activators, it may be necessary to conduct the polymerization in a substantially oxygen free environment, but normally the polymerization is conducted under atmospheric pressure in the presence of air.

The advantages of the method of the invention include the fact that through the addition of the O-W-emulsifier to a stable W-O-emulsion, one may work into the emulsion considerable amounts of water without difficulty, even at higher viscosity. At the same time, the emulsion obtained is a more homogenic one, and the formation of small water bubbles which create voids in the end product is thereby prevented. The W-O-emulsion maintains sufficient stability, even under the addition of hydrophilic substances, a fact which is particularly important with the use of fillers and also for the field of surface applications of porous polymerizates, where this advantage is important in view of the variety of possible surfaces.

In addition, it was found that especially when wetting agents are used, the water is quickly released from the porous polymerizate during drying, so that the drying times required are considerably shortened. Moreover, the tendency towards shrinking and pimpling of the final product may be somewhat reduced.

Lastly, it may be of particular importance that it is possible, by selecting the type and quantity of the O-W-emulsifiers added, to attain a specific hydrophilization of the porous polymerizates which is desirable for specific purposes, such as the production of leather-like goods, or the production of filters and separators.

While still in the liquid or semi-liquid state, the compositions are applied to a shaping member or other object by dipping, spraying, pouring, pumping, spreading or any other suitable mode of application. They may be reinforced if desired, such as by use of textile (including glass) fibers, whether randomly distributed or in the form of woven, non-woven or knitted fabrics. Prewetting of the fibers with component M followed by squeezing out the excess is desireable, and when the compositions are cast in molds, smooth-surfaced molds appear to give the best permeability.

The method of the invention is further disclosed by means of the following examples:

EXAMPLE I

In 1000 gr of polyester molding resin with a styrene content of 40 percent are dissolved 20 gr of benzoyl peroxide paste (50 percent by weight pure) and 20 gr of W-O-emulsifier, viz. a copolymerizate produced through emulsion polymerization from styrene-acrylonitrile and acrylic acid and which has an acid number between 8 and 12. From the mixture is produced a W-O-emulsion by slowly adding 2,000 gr of water under continuous agitation.

To 100 gr of this W-O-emulsion is added under constant agitation as O-W-emulsifier a commercially available alkyl-aryl sulfonate detergent concentrate. The addition is continued until the emulsion begins to break. The incipient breaking can be recognized from a change in the consistency of the emulsion or from the phase separation occurring sporadically. Following this, the agitation is continued slowly until a completely homogeneous cream-like emulsion is again obtained. Now more of the O-W-emulsifier is added until a final phase break occurs. The amount of the emulsifier which had been added up to the incipient breaking lies in the non-critical limit range. That which was added between incipient breaking and the final break lies in the critical limit range.

EXAMPLE II

The procedure of Example I is repeated except that the amount of O-W-emulsifier is varied throughout the range of approximately 25 to 80 percent of the amount lying in the non-critical range, e.g., 25 to 80 percent by weight of the total amount of O-W-emulsifier required to produce incipient breaking. The water droplets in the emulsions and the polymerized products are substantially 50 microns or less in size.

Following its pouring into a form or its application to a surface, the emulsion is cured under the influence of heat or with the help of an accelerator, and the water is expelled from the solid body at 40°C. under a stream of air. It is noted that the products dry more rapidly than those produced in the same manner, except without the O-W-emulsifier, and that the advantages of the method of the invention are in general achieved.

EXAMPLE III

The procedure of Example 1 is repeated, except that the number of grams of O-W-emulsifier which has been added in the non-critical range, in the critical range and to the point of phase break, is recorded. The technique for so doing is illustrated as follows:

If, for example, for the above-described experiment one obtains in the determination of the possible amount of O-W-emulsifier which can be added, the following values: Use in gr. per 100 ccm of emulsion

| non-critical range | critical range | phase break |
|---|---|---|
| up to 1 | 1 to 1.2 | 1.2 | then it is possible to add to the finished W-O-emulsion or to the polymerizable liquid up to 1.2 gr. of O-W-emulsifier per 100 ccm of emulsion, whereby one may choose to add the O-W-emulsifier to the polymerizable liquid, or to the finished emulsion, or to both in shares adding up to the desired total amount.

The advantages of the method of the invention may in general be achieved when using amounts of W-O-emulsifier up to that which produces the phase break, provided the emulsions are handled with care. If any degree of mechanical shock or shear is liable to be encountered prior to solidification of the compositions by polymerization, the use of an amount in the non-critical range is to be preferred.

EXAMPLE IV

The procedure of Example II is repeated, substituting the following O-W-emulsifiers in the amounts indicated, in percent by weight based on the weight of O-W-emulsifier, respectively, which constitutes the upper limit of the non-critical range for the emulsifier being used in each run:

A. Alkylphenylpolyglycolether, 50 percent.
B. Triethanolamine-tetrapropylene-benzenesulfonate, 40 percent.
C. Fatty acid condensation product sold by Farbwerke Hochst under trademark "Hostapon", 35 percent.
D. Commercially available wetting agent composed of higher molecular weight alkylsulfate, alkylbenzene sulfate and electrolyte, 30 percent.
E. Commercially available wetting agent, combination of fatty alcohol sulfonate, long chain alkylaryl sulfonate, such as sodium para dodecyl benzene sulfonate, alkylene benzoyl polyglycol ether, alkylsulfonate, 75 percent.
F. Fatty alcohol sulfonate, 70 percent.
G. Common soap, 60 percent.

Those O-W-emulsifiers which are normally solid are added as concentrated watery solutions. When the emulsions are polymerized, products of improved drying properties are obtained.

What is claimed is:

1. A polymerizable water-in-oil emulsion, the liquid components of which consist of two phases, said phases being droplets of a discontinuous aqueous liquid phase emulsified in a continuous liquid oil phase comprising from 5 to 100 percent by weight of at least one polymerizable compound containing at least one ethylenically unsaturated group, said emulsion also containing water-in-oil emulsifier in an amount sufficient to maintain said emulsion and oil-in-water emulsifier which is capable of breaking said emulsion, said oil-in-water emulsifier being present in said emulsion in amount which is sufficient, upon polymerization of the emulsion, to increase the open cell content of the resultant product, said amount being at least 25 percent by weight of the amount of said oil-in-water emulsifier which is required to produce insipient breaking of said emulsion but less than the amount required to break said emulsion.

2. An emulsion in accordance with claim 1 wherein said at least one ethylenically unsaturated compound includes styrene.

3. An emulsion in accordance with claim 1 wherein said at least one ethylenically unsaturated compound includes unsaturated polyester resin dissolved in styrene.

4. An emulsion in accordance with claim 1 wherein the amount of said oil-in-water emulsifier represents 25 to 80 percent by weight of the total quantity of said emulsifier required to produce incipient breaking of the emulsion.

5. An emulsion in accordance with claim 1, the water droplets in which are substantially 50 microns or less in size.

6. An emulsion in accordance with claim 1 wherein said emulsion contains a polymeric water-in-oil emulsifier.

7. An emulsion in accordance with claim 6 wherein said polymeric emulsifier contains, per 100 weight parts of polymer, 1.0 to 4.0 parts by weight of OH groups.

8. An emulsion in accordance with claim 6 wherein said polymeric emulsifier contains, per 100 weight parts of polymer, 0.3 to 7.5 parts by weight of $-SO_3H$ groups.

9. An emulsion in accordance with claim 6 wherein said polymeric emulsifier contains, per 100 weight parts of polymer, 0.6 to 2.0 parts by weight of $-SO_3Na$ groups.

10. An emulsion in accordance with claim 6 wherein said polymeric emulsifier contains, per 100 weight parts of polymer, 1.0 to 6.0 parts by weight of $=SO_4$ groups.

11. An emulsion in accordance with claim 6 wherein said polymeric emulsifier contains, per 100 weight parts of polymer, 0.5 to 10.0 parts by weight of $-CONH_2$ groups.

12. An emulsion in accordance with claim 6 wherein said water-in-oil emulsifier is a polyester.

13. An emulsion in accordance with claim 1 wherein said water-in-oil emulsifier is employed in an amount in the range of about 0.1 to 10 percent by weight based on the oil phase.

14. An emulsion in accordance with claim 1 wherein said water-in-oil emulsifier is at least one non-polymeric emulsifier selected from the group consisting of hexadecyl sodium phthalate, sorbitan monooleate, sorbitan monostearate, cetyl sodium phthalate, stearyl sodium phthalate, high molecular weight alcohols, alkaline earth metal soaps, aluminum soaps, fatty acid anilides, sterines and steroids.

15. An emulsion according to claim 1 wherein said oil-in-water emulsifier is at least one member selected from the group consisting of:
   a. an alkylphenylpolyglycolether
   b. tetraethanolamine-tetrapropylene-benzenesulfonate
   c. a fatty acid condensation product known as Hostapon
   d. common soap
   e. commercially available wetting agent mixtures of higher molecular weight alkylsulfate, alkylbenzene sulfate and electrolyte
   f. fatty alcohol sulfonate alone or in commercially available wetting agent mixtures with long chain alkylaryl sulfonates.

* * * * *